Figure 1:
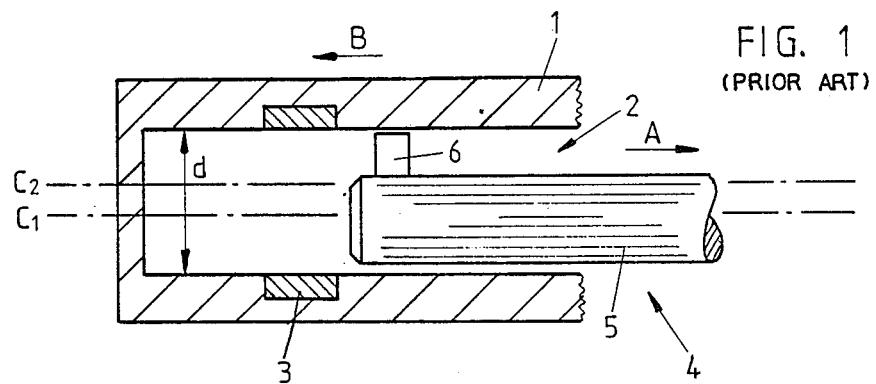

United States Patent [19]

Schneider

[11] Patent Number: 4,759,245

[45] Date of Patent: Jul. 26, 1988

[54] MACHINING TOOL ASSEMBLY

[75] Inventor: Rudolf Schneider, Reinach, Switzerland

[73] Assignee: Erowa AG, Reinach, Switzerland

[21] Appl. No.: 730,806

[22] Filed: May 6, 1985

[30] Foreign Application Priority Data

May 11, 1984 [DE] Fed. Rep. of Germany ....... 3417450

[51] Int. Cl.$^4$ .......................... B23B 3/26; B23B 29/03
[52] U.S. Cl. .......................................... 82/1.4; 408/81
[58] Field of Search ............... 408/153, 157, 158, 179, 408/161, 23, 168, 81, 82, 83, 79, 80; 82/1 R, 1.2, 1.4, 79, 80, 81, 82, 2 E; 409/143, 200, 204, 206

[56] References Cited

U.S. PATENT DOCUMENTS

| | | | |
|---|---|---|---|
| 2,278,631 | 4/1942 | Young | 408/157 |
| 2,848,912 | 8/1958 | Kalat | 408/153 |
| 3,299,749 | 1/1967 | Koppelmann | 408/158 |
| 3,438,287 | 4/1969 | Kampmeier et al. | 408/79 |
| 3,542,528 | 11/1970 | Beech | 408/153 |
| 4,260,303 | 4/1981 | Newman | 408/168 |
| 4,387,612 | 6/1983 | Eckle et al. | 82/1.2 |

FOREIGN PATENT DOCUMENTS 1233868 10/1960 France .

Primary Examiner—Z. R. Bilinsky
Attorney, Agent, or Firm—Tarolli, Sundheim & Covell

[57] ABSTRACT

The invention refers to a tool assembly for cuttingly machining of an at least partially closed inner surface of a workpiece, e.g. a bore. It comprises an essentially rod-shaped tool support having a machining tool mounted on its end and which is adapted to be inserted into the cavity to be machined. The tool support comprises a rod member with a continuous opening extending in axial direction and with parallel supporting surfaces arranged in the region of the both ends and extending with an angle to the longitudinal axis of the rod member. A machining tool supporting member having a machining tool mounted at one end is slidably mounted at one end of the rod member and rests against the first supporting surfaces of the rod member. A control member is slidably mounted at the other end of the rod member perpendicularly to the axis of the tool support and resting on the second supporting surface, serving for the pushing-out and retiring of the tool supporting member. To this purpose a connecting member extending through the opening of the rod member is provided, being connected, with its one end, to the machining supporting member and, with its other end, to the control member, thereby coupling these elements together in a predetermined distance.

12 Claims, 3 Drawing Sheets

MACHINING TOOL ASSEMBLY

BACKGROUND OF THE INVENTION

1. Field of the Invention

The present invention refers to a machining tool assembly for cuttingly machining of an at least partially closed inner surface of a workpiece, e.g. the inner surface of a blind bore provided in a workpiece.

In practice, often the need arises to cuttingly machine a workpiece in its interior along one of the inner surfaces thereof. For instance, the workpiece might have a cylindrical bore, the diameter thereof having to be enlarged along a certain portion. Usually such machining operation is performed on a turning lathe by means of a tool assembly which comprises an essentially cylindrical tool support, the end thereof being equipped with a machining tool, e.g. a cemented carbide cutting steel or the like. The tool support including the machining tool is inserted into the opening to be further machined, whereby a relative rotational movement between the machining tool and the workpiece to be machined is effected during the cutting operation. This may be performed either by rotating the machining tool and fixing the workpiece or by rotating the workpiece to be machined and fixing the machining tool.

In order to enable such machining of the interior of a workpiece to be effected, the tool assembly has to be inserted into the cavity, e.g. the blind bore of the workpiece, the inner surface of which has to be machined. It is thereby necessary that the total outer diameter in radial direction of the tool support and the machining tool be less than the diameter of the opening provided in the workpiece. In this connection a number of partially contrary requirements have to be met:

In the interest of the highest possible stability, and thereby of the best possible machining accuracy, the shaft portion of the tool assembly which supports the machining tool has to be rigid and insensitive to bending; consequently it should have a large diameter. As the machining tool itself has to protrude from the shaft surface, the consequence is that the useful width of the tool is comparatively small and the tool assembly may be used but within a very narrow machining range.

To the contrary, it is desirable to design the shaft supporting the machining tool with a comparatively small diameter in order to increase the useable machining range of the tool assembly. Such a proceeding, however, will result in a decreased rigidity of the assembly and therefore in a decreased machining accuracy, since the shaft of the tool assembly is clamped but at one side and is thereby subjected to a pronounced bending stress.

2. Prior Art

Machining tool assemblies known up to know suffer from the disadvantage that they are subjected to more or less pronounced flexural vibrations during the machining operation of the workpiece, with the result that, in the best case, a decreased accuracy of the machining operation must be accepted, but, in the worst case, an early destruction of the quite expensive machining tool occurs. Sometimes a cutting of workpieces is not reliable or even impossible with such a tool assembly due to the occurence of the aforementioned flexural vibrations, so that the machining of the workpiece has to be done by means of other processes, often with the need to use very expensive special tools.

A machining tool assembly which appears similar on the first sight to the machining tool assembly provided by the present invention is disclosed in the French Pat. No. 1,233,868. This assembly is intended to machine the internal surfaces of a workpiece as well and comprises also a rod-like tool support, the end thereof receiving a radially adjustable machining tool. However a very important difference may be seen in the fact that the machining tool assembly according to the aforementioned French Patent refers not to a tool for rotative machining, but to an oscillating tool which is used to cut longitudinal grooves, parallel to the axis, into the internal surface of a bore. The assembly according to the French Patent could not be used for the purpose of the present invention, i.e. to partially increase the diameter of a bore in a workpiece or to provide annular, coaxial grooves in the inner surface thereof.

OBJECTS OF THE INVENTION

Primarily it is an object of the invention to avoid the aforementioned disadavantages of a tool assembly of this kind and to provide a tool assembly which allows an extremely precise machining e.g. of the inner bore of a workpiece in order to increase its diameter along a preselectable axial portion, whereby all problems in connection with the uncontrollable vibrations may be solved, so that the useful lifetime of the tool assembly, particularly the machining tool, is essentially increased and the possibility of machining with such a tool is improved.

SUMMARY OF THE INVENTION

The invention provides a tool assembly for cuttingly machining of an at least partially closed inner surface of a workpiece, which comprises an essentially rod-shaped tool support having a machining tool mounted on its end and which is adapted to be inserted into the cavity to be machined. The tool support comprises a rod member with a continuous opening extending in axial direction and having parallel supporting surfaces arranged in the region of the both ends which extend with an angle to the longitudinal axis of the rod member. There is further provided at least one machining tool or machining tool supporting member slidably mounted at one end of the rod member and resting against the first supporting surface or the first supporting surfaces of the rod member. A control member slidably mounted at the other end of the rod member and being moveable perpendicularly to the axis of the tool support rests on the second supporting surface. A connecting member extending through the opening of the rod member is connected, with its one end, to the machining tool or machining tools or to the machining tool supporting member or machining tool supporting members and, with its other end, to the control member, thereby coupling these elements together in a predetermined distance.

The aforementioned angle may be in the region between 25° to 65° with reference to the longitudinal axis of the rod member, but will be usually an angle of at least nearly 45°.

In a preferred embodiment of the tool assembly, the first supporting surfaces arranged at the free end of the rod member are constituted by a continuous channel penetrating the rod member with an angle of 45°, the machining tool or the machining tool supporting member being slidably mounted in said channel. This measure allows, together with other measures to be further discussed hereinafter, the machining tool or the machining tool supporting member to be displaced in essentially radial direction with reference to the axis of the rod member into a protruding operating position and back to a rest position, the longitudinal axial position of the operative part of the machining tool remaining thereby unchanged.

Basically there is a number of possibilities for the practical realization; as already mentioned, the channel which is inclined in an angle of 45° may displaceably receive either the machining tool itself or the machining tool supporting member. In the latter case the machining tool, e.g. a cemented carbide cutting steel, is connected to the free end of the machining tool supporting member. Anyway it is advantageous if the channel has a polygonal cross section and if the machining tool supporting member or the machining tool has a corresponding prismatic cross sectional shape, so that a rotation about their axis is prevented with certainty.

If the rod member comprises a frontal surface at its end opposite to said free end which is inclined with an angle of 45° and against which the control member rests, and if the control member is constituted by a wedge-shaped member which comprises a first surface facing the rod member, resting against its frontal surface and being inclined, with reference to the longitudinal axis of the tool support, with an angle of 45°, and a second surface facing a rest member and extending perpendicularly to the axis of the tool support, a simple solution is provided, on the one hand to support the rod member in axial direction and, on the other hand, to effect an axial displacement of the rod member by a displacement of the wedge-shaped member in a direction perpendicular to the longitudinal axis.

To this purpose the wedge-shaped member is operatively connected to a driving means adapted to displace the member in at least one direction perpendicular to the axis of the tool support.

There are different possibilities for the realization of the rest member as well, depending on the fact whether the entire tool assembly should be rotatably or fixedly mounted. In any case, the rest member shall be an element which is displaceable in two directions perpendicular to each other and, in turn, perpendicular to the direction of the axis of the tool support, but being fixedly connected against a displacement in the direction of said axis.

If a solution is choosen in which the tool assembly is fixedly and thereby non-rotatably mounted, the rest member may be a cross table displaceable in X- and Y-direction, but being fixed in Z-direction.

If however a rotatable mounting of the tool assembly has to be realized, the rest member might be an essentially disc-shaped hydrostatic bearing element which is radially displaceable and rotatable, but fixedly mounted in the direction of the axis of the tool support.

In a preferred, further developed embodiment of the machining tool assembly according to the invention, at least a portion of the outer surface of the rod member has an outer diameter which at least nearly corresponds to the inner diameter of the cavity to be machined. Thereby a precise well-defined guidance of the free end of the tool assembly is ensured which mainly favors the machining precision and the useful operating life of the machining tool.

Particularly if the rod member has a portion situated at its free end, receiving the machining tool or the machining tool supporting member and having a diameter which corresponds at least nearly to the inner diameter of the cavity to be machined, the bore in the workpiece which has to be enlarged along a portion thereof may be used as a guide track which supports and guides the free end of the tool assembly incorporating the machining tool and having a corresponding diameter.

In a further, preferred embodiment, the rod member is displaceably mounted in the longitudinal direction. By means of this longitudinal displaceability and due to the fact that, on the one hand, the machining tool or the machining tool supporting member and, on the other hand, the preferably wedge-shaped control member, which is displaceable in a perpendicular direction to the axis of the tool assembly are interconnected and coupled together by means of the connecting member extending through the opening of the rod member, it is ensured that a displacement of the wedge-shaped control member in a direction perpendicular to the axis results in an ejecting and retiring, respectively, of the machining tool or the machining tool supporting member. Thereby the possibility is given to insert the tool assembly, particularly the rod member thereof, into the bore to be machined while the machining tool is fully retired and then to eject the machining tool in a desired degree from its retired position by a displacement of the control member in a direction perpendicular to the axis in order to initiate the machining operation.

In a preferred embodiment of the tool assembly of the invention, particularly in order to effect the aforementioned axial displacement of the rod member, a combined radial-axial-bearing may be provided for displaceably receiving the rod member and additionally, if appropriate, for guiding the rod member, which is operatively coupled to the tool assembly for axially displacing the rod member and connected to a driving member.

In certain cases it might be advantageous if the tool assembly comprises, two machining tools or machining tool supporting members including an angle between each other and resting against the supporting surface/surfaces which is/are inclined with an angle of 45°. Sometimes this measure results in a quicker and/or preciser machining of the workpiece.

SHORT DESCRIPTION OF THE DRAWINGS

Figure 2A:
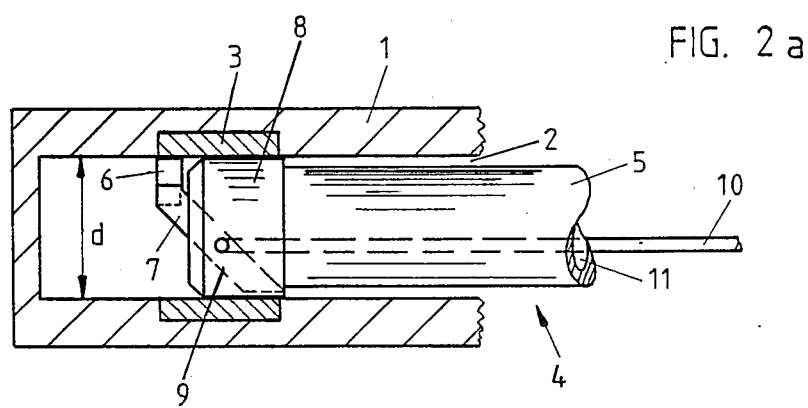
Figure 2B:
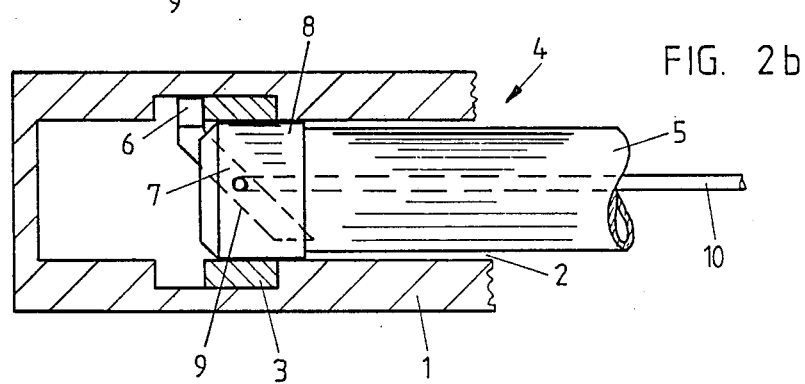
Figure 3A:
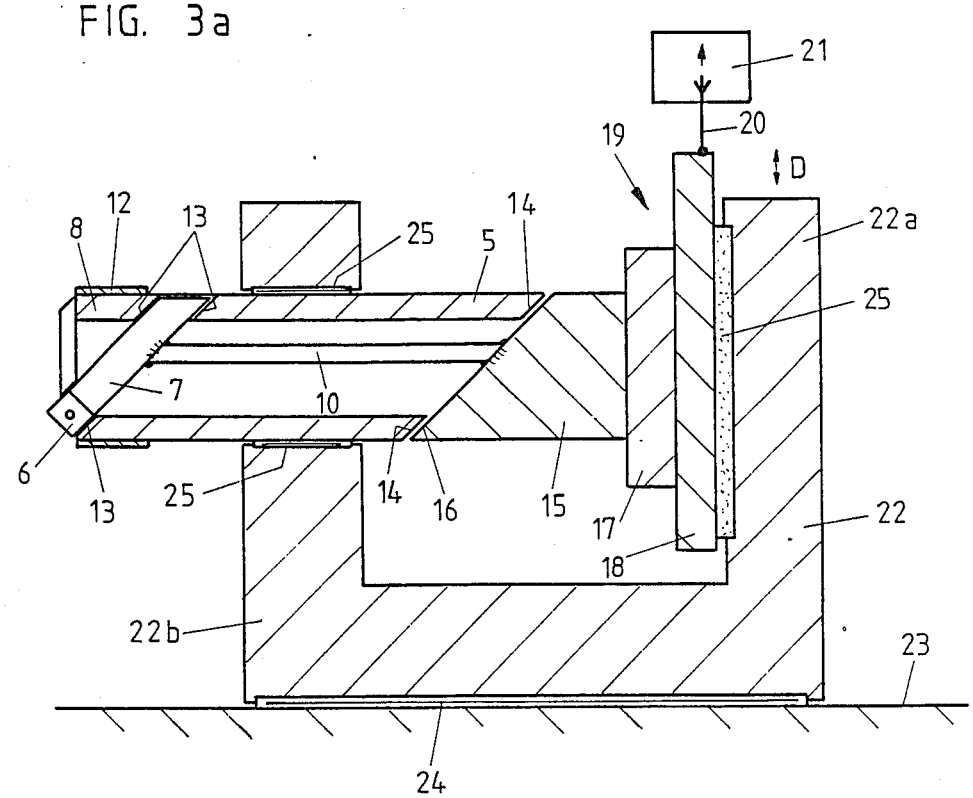
Figure 4A:
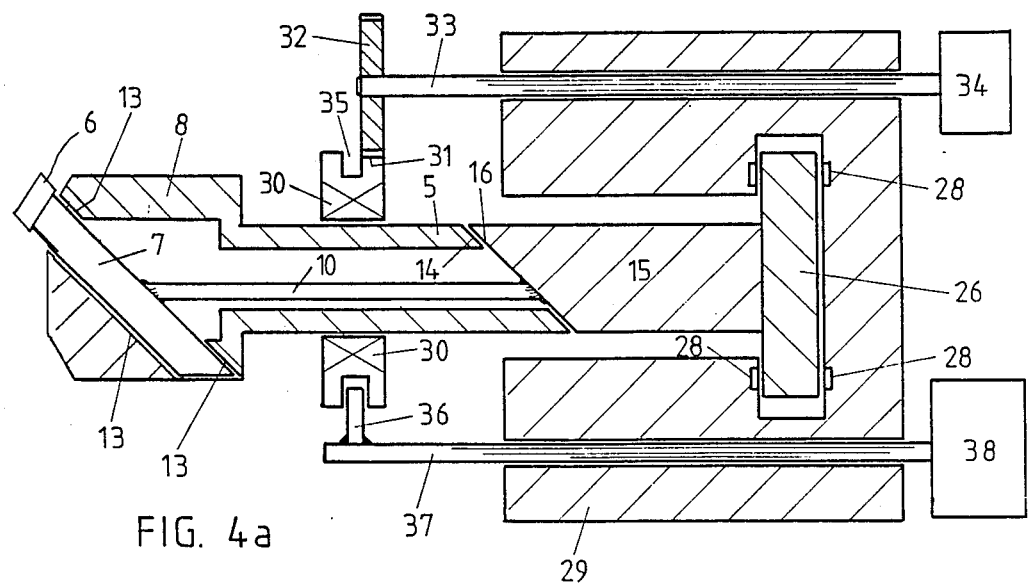
Figure 3B:
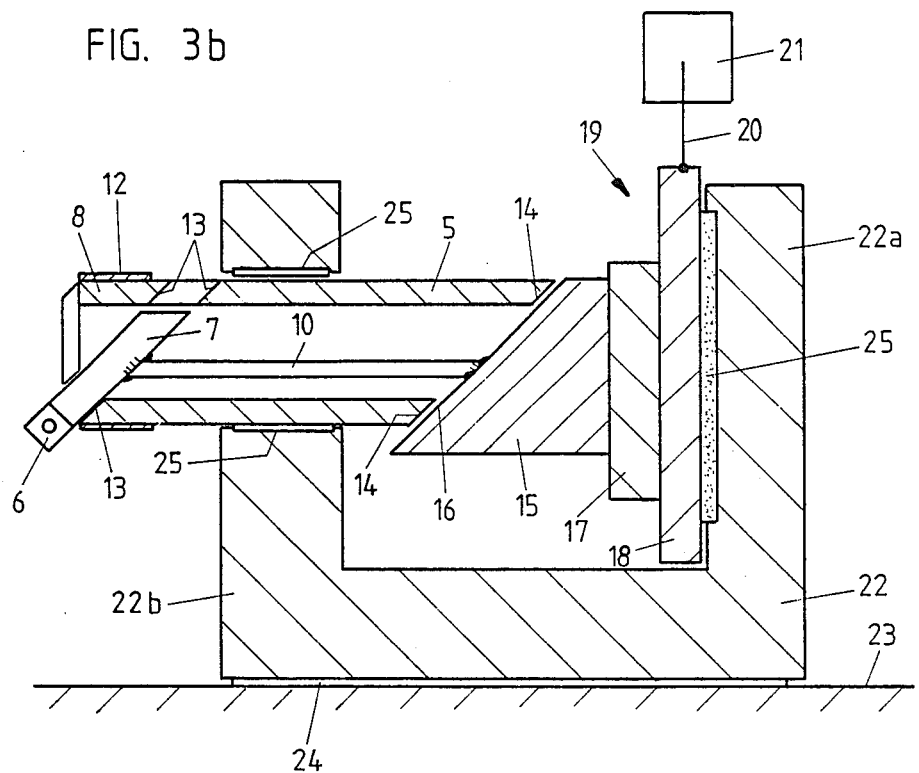
Figure 4B:
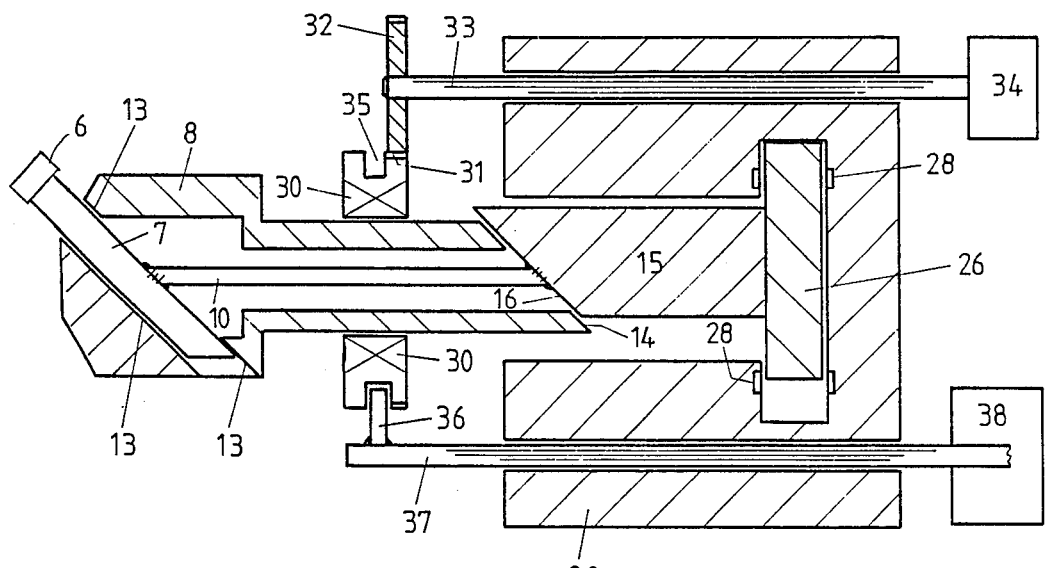

In the following description some embodiments of the object of the invention are explained in more detail, with reference to the enclosed drawings. Particularly the drawings show in:

FIG. 1 a schematic, partially cut side view of a tool assembly of the prior art, FIGS. 2a and 2b schematic, partially cut side views of a tool assembly according to the invention, FIG. 3a a schematic axial sectional view of a first embodiment of the tool assembly of the invention with retired machining tool, FIG. 3b a schematic axial sectional view of the first embodiment according to FIG. 3a with extended machining tool, FIG. 4a a schematic axial sectional view of a second embodiment of the tool assembly of the invention with retired machining tool, and FIG. 4b a schematic axial sectional view of the second embodiment according to FIG. 4a with extended machining tool.

DESCRIPTION OF SOME PREFERRED EMBODIMENTS

In FIG. 1 there is shown the basic arrangement in a schematic view of a known, conventional kind in order to show how e.g. a blind bore may be partially increased in its diameter according to the prior art.

The workpiece 1, which is but partially shown, comprises a blind bore 2, the diameter of which has to be enlarged in a certain axially extending portion 3. This portion 3 is shown in the drawing as cross-hatched sectional region. To this purpose a tool assembly is used, only the end portion 4 thereof being shown in the drawing. The end portion 4 includes a tool support in the form of a shaft- or rod-like member 5 which receives a radially extending machining tool, e.g. a cemented carbide cutting steel, at its end.

In order to enable the rod member 5 with its protruding tool 6 to be inserted into the blind bore to be machined, the total dimension of the tool, measured in a direction perpendicular to its axis, is allowed to have not more than the value b, i.e. the value of the inner diameter of the blind bore 2. The insertion of the tool into the workpiece 1 is effected along the axis $C_1$.

Now the rod member 5 is displaced in the direction of the arrow B until the operating edge of the machining tool 6 has reached a predetermined position within the portion 3 to be machined and the shaft is fixed. It is easily understood that the fixing of the rod member 5 may be effected but at a position which is relatively far away from the machining tool 6 so that particularly the end portion of the rod member shown in FIG. 1 is subjected to a comparatively pronounced bending stress.

Now the workpiece 1 which has been clamped in a suitable machining apparatus, e.g. a turning lathe (not shown), is rotated, whereby the axis $C_1$ is slowly parallely shifted in a direction towards the axis $C_2$. Thereby the operating edge of the machining tool 6 comes closer to the the portion 3 to be machined and removes the cross-hatched material of the workpiece 1. Of course it is necessary, besides a displacement of the axis $C_1$ towards the axis $C_2$, to displace the rod member 5, if appropriate simultaneously or alternatingly, in the direction of the arrow A as well as in the direction of the arrow C to ensure the desired removal of the material.

Resulting from the but one-sided clamping of the shaft end 5 shown in FIG. 1, the machining tool 6 mounted at the end thereof is badly guided and the problems already discussed in the opening paragraph of this specification occur, particularly an unprecise machining of the workpiece due to the insufficient guiding and supporting of the machining tool 6 and the danger of a destruction of the machining tool 6 due to uncontrolled vibrations.

The present invention will provide a remedy to these problems with a novel tool assembly. The basic operation principles are thereby shown in the schematic views of FIG. 2, in which FIG. 2a represents the initial or rest position and FIG. 2b represents the operating position of the tool assembly.

In order to clearly explain the basic principle of the invention, it is supposed that the conditions be exactly the same as discussed in connection with FIG. 1: A workpiece 1 having a blind bore 2 has to be machined so as to increase the diameter of the blind bore 2 along a cross-hatched portion 3. To this purpose the assembly comprises a shaft- or rod-shaped tool members 5, only the end portion 4 thereof being schematically shown in FIGS. 2a and 2b, which is equipped with a machining tool 6 mounted at the free end of the end portion 4. The tool 6 is received in a tool supporting member 7 which is slidably mounted in a tool head 8. In order to enable the tool head 8 to receive the tool supporting member 7, the head 8 is equipped with a receiving channel 9, the direction thereof enclosing an angle of 45° with the axis of the rod-member 5.

The outer diameter d of the tool head 8 corresponds, at least approximatly, considering standard tolerances, to the inner diameter of the blind bore 2 to be machined.

In the position shown in FIG. 2a the tool supporting member 7 and thereby the machining tool 6 is in a retired position, such that the operating edge of the machining tool does not protrude above the periphery of the tool head 8. Thereby two advantages may be achieved:

The diameter d of the tool head 8 may be adapted exactly to the diameter of the blind bore 2 to be machined, the latter one thereby constituting a precise and stable guide of the entire tool assembly.

The diameter of the member support 5 may be choosen relatively large and posses thereby a considerably increased resistance against bending forces and uncontrollable vibrations.

The tool supporting member 7 is coupled to a coupling member 10 which extends through an axial opening provided in the rod-member, the purpose thereof being explained hereinafter.

According to the representation shown in FIG. 2b, the machining of the workpiece 1 is effected by means of the machining tool 6 pushed out of the tool head 8. Basically it is of no importance whether the workpiece 1 to be machined or the tool head 8 with the machining tool 6 is driven to a rotational movement. A displacement of the machining tool 6 into the portion 3 to be removed is effected by a displacement of the tool supporting member 7 along the receiving channel 9. To this purpose the coupling member 10 plays an important role which will be explained in more detail hereinafter. It is clearly understood that it will be necessary, during the machining of the workpiece 1, either to axially displace the tool assembly in the direction of the arrow A or to axially displace the workpiece 1 in the direction of the arrow B. Furthermore it must be noted that the feed of the machining tool 6 in a radial direction, preferably under the influence of NC-means, must be coordinated with the relative displacement between workpiece and tool arrangement.

Anyway it may be clearly seen from the representation of FIG. 2b that the tool head 8 is guided at least along an important portion of its axial extension by the inner wall of the blind bore 2 to be machined, resulting in the fact that a precise machining is ensured and that the occurrence of any vibrations, commonly occurring in conventional machining of this kind, is effectively prevented.

According to FIG. 3a there is shown a schematic representation of an embodiment of the tool assembly according to the invention in an axial sectional view. Clearly recognized therefrom are the tool head 8 which may comprise a circumferential guiding sleeve 12, and the machining tool supporting member 7 extending with an angle of 45° with reference to the axis of the tool assembly, slidably received in the tool head 8 and bearing the machining tool 6 at one end thereof, as well as the rod member 5. The tool supporting member 7 receiving the machining tool 6 rests thereby against supporting surfaces 13 inclined with an angle of 45° with reference to the longitudinal axis of the tool assembly, which are constituted by the walls of a channel having e.g. prismatic cross section.

The opposite end of the rod member 5 is provided with parallel supporting surfaces 14 inclined with an angle of 45° as well which rest against a wedge-shaped element 15 having a supporting surface 16 inclined also with an angle of 45°. The tool supporting element ist rigidly connected to to the wedge-shaped element 15 by means of the aforementioned connecting element 15. The element 15 rests with its end surface on a cross table 19 constituted by two plate members 17 and 18, whereby the plate member 18 is connected to a drive unit 21 by means of a connecting element 20 which is adapted to effect a displacement of the plate member 18 in both directions according to the arrow D.

The entire assembly is supported by a tailstock 22 which is mounted on a machine base 23 by means of a linear guide 24. The plate member 18 of the cross table 19 rests on the back leg 22a of the tailstock 22 via a bearing 25 and is thereby secured against axial displacement. A front leg 22b of the tailstock 22 comprises an opening with a bearing 25 arranged therein which receives and guides the rod member 5.

It can be seen from the representation in FIG. 3a that the tool assembly is in a rest position, the machining tool 6 being retired, so that the latter one may be inserted into a blind bore of a workpiece (not shown). In this position the rod member 5 and the wedge-shaped element 15 are aligned more or less coaxially to each other.

The representation of FIG. 3b shows the position of the elements of the tool assembly during the cutting operation on the inner surface of a blind bore. It may be clearly seen that the machining tool 6 protrudes from the peripheral surface of the tool head 8 with its operating edge, while the head 8 is supported by means of the guiding sleeve in the bore to be machined.

The pushing-out of the tool supporting member 7 and thereby of the machining tool 6 is performed as follows:

Starting from the position shown in FIG. 3a, the drive 21 is operated in such a way that the plate member 18 is downwardly displaced by means of the connecting element 20 in the direction of the arrow D. The guiding bearing provided on the leg 22a of the tailstock 22 favours an effortless performance of this displacement operation.

Simultaneously the plate member 17 and thereby the wedge-shaped member 15 rigidly connected thereto is downwardly displaced. Due to the fact that the element 15 is rigidly connected to the tool supporting member 7 by means of the coupling member 10, it is displaced downwardly as well by exactly the same amount, whereby the front surface of the rod member which is inclined with an angle of 45° slides along the supporting surface 16 of the wedge-shaped element 15 which is also inclined with an angle of 45°, and whereby the tool supporting member 7 is displaced along the supporting surface 13 inclined with an angle of 45° as well. As can be seen particularly in FIG. 3b, the rod member 5 is forced to be axially displaced in the direction of the arrow E, whereby the bearing 25 is constructed preferably in such a way that it is in a position to receive and withstand the aforementioned displacement of the rod member 5, but also a possibly occurring rotational movement thereof.

The tool assembly as described hereinbefore in connection with FIGS. 3a and 3b is particularly suitable to cuttingly machine a rotated workpiece (not shown) by means of the fixedly mounted tool assembly under the influence of the machining tool 6. It must be pointed out in this connection that the really effective operating edge of the machining tool 6 is displaced only in a direction which is perpendicular to the longitudinal axis of the tool assembly if it is driven out of the rod-shaped tool support. Consequently no axial displacement of the latter in the direction of its axis is necessary which would have to be coordinated with the proceeding pushing-out of the machining tool 6. However, since in practise in most cases a machining of an axially extending portion of the workpiece will be necessary, measures must be taken to simultaneously control the pushing-out of the machining tool 6 by operating the drive unit 21 and the axial displacement of the workpiece; anyway the geometric conditions to effect such simultaneous control are very simple and easily to perform.

Under certain circumstances it may be desirable to fixedly clamp the workpiece to be machined and to drive the tool assembly to a rotational movement in order to perform the desired machining operation of the workpiece. Such an embodiment is shown in the FIGS. 4a and 4b, whereby FIG. 4a again shows a rest position in which the machining tool is in its retired position, in which it does not protrude beyond the outer surface of the tool head, while FIG. 4b represents the position of the machining tool 6 during the real machining operation.

Controry to the embodiment shown in FIGS. 3a and 3b, the wedge-shaped rest element 15 is connected to a hydrostatic bearing plate member 26 which is received in a hydrostatic bearing assembly 27. The latter one is provided with pressure oil feeding means 28. Such a hydrostatic bearing assembly being well known in the prior art removes the need to further explain the construction thereof. Anyway the hydrostatic bearing plate member is enabled not only to perform a rotational movement, but also a rocking movement in all directions perpendicular to the rotational movement.

The wedge-shaped element 15 with the hydrostatic bearing plate member 26 connected thereto is received in a bearing block 29. According to FIGS. 4a and 4b the wedge-shaped element 15 comprises a front surface 16 inclined with an angle of 45°, against which the front faces 14, inclined by an angle of 45° as well, rest. The rod member 5 is supported and guided by means of two bearings, so-called combined radial-axial-bearings 30. The construction and design of the tool head including the machining tool supporting member 7, the connecting rod 10 which is connected to the wedge-shaped element 15, corresponds to the construction and design of the embodiment shown in and explained in connection with FIGS. 3a and 3b.

The bearing 30 is fixedly connected to the rod member 5 as far as the rotation is concerned, whereby a portion of its periphery 31 is provided with a gear toothing meshing with a gear wheel 32; the gear wheel 32 is driven to a rotational movement by a motor 34 via a shaft 33 with the consequence that the tool head 8 performs a rotational movement as well.

Furthermore the bearing 30 is equipped with a circumferential circular groove 35; a follower member 36 arranged at the free end of a axially displaceable shaft 37 engages the groove 35. A drive unit 38 is adapted, under the influence of a (not shown) control means, to axially displace the rod member 5, the shaft 33 being also axially displaceable to maintain engagement of the gear wheel 32 with the tool portion 31 of the bearing 30 when the bearing 30 is axially displaceable by the drive unit 38. Thereby, on the one hand, the radial position of the hydrostatic bearing plate 26 and, on the other hand, the position of the machining tool 6 is changed. This situation, i.e. the situation after an axial displacement of the rod-shaped tool support 5, is shown in FIG. 4b. It must be noted also in this connection that inspite of the axial displacement of the tool support 5 no axial displacement of the operating edge of the machining tool 6, but only a corresponding radial displacement of the machining tool 6 takes place.

Finally it must be pointed out that the tool head 8 as shown in FIGS. 4a and 4b may be provided with a corresponding guiding sleeve (not shown) along its periphery if its outer diameter does not correspond to the inner diameter of the bore to be machined in order to provide an exactly defined, essentially clearance-free guidance of the tool assembly, ensuring a machining with highest precision.

What I claim is:

1. A tool assembly for rotatively machining an at least partially closed inner surface of a workpiece, particularly of a bore, said tool assembly comprising:

tool support means including a rod member having an opening extending axially thereof and a tool supporting member supported by said rod member, said tool supporting member being radially adjustable relative to said rod member;

adjusting means comprising a movable control member for adjusting the radial position of said tool supporting member;

said rod member comprising first and second opposite guiding surface means extending parallel to each other and at an angle to the longitudinal axis of said rod member, said tool supporting member and said control member being slidable along said first and second guiding surface means, respectively; and a coupling member for fixedly connecting said tool supporting member and said control member to provide a predetermined distance therebetween and joint movement thereof and forming a structural unit which is slidable as a whole relative to said rod member along said first and second guiding surface means, said coupling member extending through said axially extending opening of said rod member.

2. A tool assembly as set forth in claim 1 wherein said rod member is supported for rotational and axially displaceable movement relative to a machine base, a machining drive unit is provided for rotating said rod member, said tool supporting member is supported by said rod member for joint rotation therewith and against relative rotation with respect thereto, and said control member is supported for rotation and displacement in a radial direction relative to said machine base but against axial displacement relative to said rod member.

3. A tool assembly according to claim 1 or 2 in which said first and second opposite guiding surface means are inclined to the longitudinal axis of said rod member at an angle of 25° to 65°.

4. A tool assembly according to claim 1 in which said first and second opposite guiding surface means are inclined to the longitudinal axis of said rod member at an angle of 45°.

5. A tool assembly according to claim 1 in which said control member comprises a wedge-shaped member having a first surface abutting said second guiding surface means and is inclined relative to the longitudinal axis of said rod member at an angle of 45°, and a second surface abutting a rest member and extending perpendicularly to the longitudinal axis of said rod member.

6. A tool assembly according to claim 1 in which said rest member comprises an essentially disc-shaped hydrostatic bearing member which is radially displaceable and rotatable, but is fixed axially relative to said tool supporting member.

7. A tool assembly according to claim 1 further comprising driving means for displacing said wedge-shaped member in a direction perpendicular to the longitudinal axis.

8. A tool assembly according to claim 1 or 2 in which said rest member is displaceable in two mutually perpendicular directions which are perpendicular to said longitudinal axis but is fixed against displacement in the direction of said longitudinal axis.

9. A tool assembly according to claim 1 in which said first guiding surface means is located at the free end of said rod member and is defined by a channel extending inside of said rod member at an angle of 45°, said machining tool being slidably mounted in said channel.

10. A tool assembly according to claim 1 in which at least a portion of the outer surface of said rod member has an outer diameter which essentially corresponds to the inner diameter of the bore to be machined.

11. The tool assembly according to claim 1 in which said rod member at its free end has a portion for receiving said tool supporting member and having a diameter corresponding essentially to the inner diameter of the bore to be machined.

12. A tool assembly according to claim 1 comprising a combined radial-axial-bearing for axially displacing said rod member and a driving member for driving said radial-axial-bearing.

* * * * *